US007069519B1

(12) United States Patent
Okude et al.

(10) Patent No.: US 7,069,519 B1
(45) Date of Patent: Jun. 27, 2006

(54) METHOD, APPARATUS AND NAVIGATION APPARATUS FOR SHARING DISPLAY BY PLURAL OPERATING SYSTEMS

(75) Inventors: Mariko Okude, Hitachi (JP); Yoshitaka Atarashi, Hitachi (JP); Yoshinori Endo, Mito (JP); Tadashi Kamiwaki, Tokai (JP); Masahiko Saito, Hitachi (JP); Hiroshi Ohno, Hitachi (JP); Kozo Nakamura, Hitachiota (JP)

(73) Assignees: Hitachi, Ltd., Tokyo (JP); Xanavi Informatics Corporation, Zama (JP)

( * ) Notice: Subject to any disclaimer, the term of this patent is extended or adjusted under 35 U.S.C. 154(b) by 693 days.

(21) Appl. No.: 09/668,169

(22) Filed: Sep. 25, 2000

(30) Foreign Application Priority Data

Sep. 24, 1999 (JP) ................................. 11-270744

(51) Int. Cl.
*G09G 5/00* (2006.01)
(52) U.S. Cl. ....................................... 715/778; 715/764
(58) Field of Classification Search ................ 345/700,
345/778–779, 781, 794–797, 802; 710/260;
715/778, 779, 783, 790, 802, 794, 795, 796,
715/797
See application file for complete search history.

(56) References Cited

U.S. PATENT DOCUMENTS

| | | | | |
|---|---|---|---|---|
| 4,439,759 A | * | 3/1984 | Fleming et al. | 345/601 |
| 4,744,048 A | | 5/1988 | Blanset et al. | 345/806 |
| 5,394,519 A | * | 2/1995 | Bodin | 345/593 |
| 5,602,565 A | * | 2/1997 | Takeuchi | 345/634 |
| 5,774,720 A | | 6/1998 | Borgendale et al. | 719/329 |
| 5,948,039 A | * | 9/1999 | Kume et al. | 701/200 |
| 6,407,758 B1 | * | 6/2002 | Usami et al. | 345/778 |
| 6,686,936 B1 | * | 2/2004 | Nason et al. | 345/778 |

FOREIGN PATENT DOCUMENTS

| | | |
|---|---|---|
| DE | 19522185 | 11/1998 |
| JP | 1-106220 | 4/1989 |
| JP | 1-214955 | 8/1989 |
| JP | 3-282640 | 12/1991 |
| JP | 5-197662 | 8/1993 |
| JP | 5-257629 | 10/1993 |
| JP | 11-24943 | 1/1999 |
| JP | 11-149385 | 6/1999 |
| JP | 2000-76087 | 3/2000 |

* cited by examiner

*Primary Examiner*—Kristine Kincaid
*Assistant Examiner*—Thanh Vu
(74) *Attorney, Agent, or Firm*—Crowell & Moring LLP

(57) ABSTRACT

In a display apparatus where a plurality of operating systems are operated on a single processor, the plurality of operating systems share one and the same display in different display environments one example of which is a color pallet. In order to implement this configuration, the display apparatus includes the following configuration components: The plurality of operating systems, a display switching processing unit for switching the displays of the plurality of operating systems, graphics-drawing frames corresponding to the plurality of operating systems, and a display environment changing processing unit for changing, in correspondence with the display switching performed by the display switching processing unit, the display environments such as the color pallet, a color mode, and a frame address.

3 Claims, 14 Drawing Sheets

WHEN ▼ IS PUSHED DOWN,
TRANSFER INPUT COMMAND
TO OS1

SCROLLING MAP IN DOWNWARD
DIRECTION IN OS1

WHEN ▼ IS PUSHED DOWN,
TRANSFER INPUT COMMAND
TO OS2

SCROLLING MAIL IN DOWNWARD
DIRECTION IN OS2

METHOD, APPARATUS AND NAVIGATION APPARATUS FOR SHARING DISPLAY BY PLURAL OPERATING SYSTEMS

CROSS-REFERENCE TO RELATED APPLICATIONS

The present invention is related to (1) U.S. patent application No. 09/574,839 claiming the Convention Priority based on Japanese Patent Application No. 11-140,914, (2) U.S. patent application No. 09/151,270 claiming the Convention Priority based on Japanese Patent Application No. 10-8299 (JP-A-11-149385), (3) U.S. patent application No. 09/107,338 claiming the Convention Priority based on Japanese Patent Application No. 09-191,840 (JP-A-11-24943), and (4) U.S. patent application No. 09/585,120 claiming the Convention Priority based on Japanese Patent Application No. 10-242,833 (JP-A-2000-76087).

BACKGROUND OF THE INVENTION

1. Field of the Invention

The present invention relates to a display apparatus where plural operating systems are operated on a single processor. In particular, the present invention relates to a control method for sharing one and the same display device and to a display apparatus using the control method.

2. Description of the Prior Art

In a conventional display apparatus, i.e., for example, a display apparatus in a navigation apparatus, one operating system is operated. Moreover, the one operating system executes a resource schedule so that it can manage and efficiently operate resources such as a CPU, a memory, and a display.

By the way, there exist various types of operating systems, the examples of which are a type that is superior in a batch processing, a type that is superior in GUI (Graphical User Interface) in office paperwork, a type that is superior in a real time processing, and so forth. In order to extract these plural characteristics, there is the need for wishing to execute plural operating systems simultaneously on one processor. For example, in the navigation apparatus, there is a request for wishing to simultaneously operate an operating system where a development tool has been prepared and the operating system that is superior in the real time characteristic. This request results from the following reason: In the operating system where the development tool has been prepared, communications functions such as the GUI and a mail can be easily developed, whereas in the operating system (which, hereinafter, will be abbreviated as the OS) that is superior in the real time characteristic, a processing such as a map scroll can be processed at a high-speed.

SUMMARY OF THE INVENTION

As a mechanism where the plural OSs share the one display, in Japanese Patent Application No. 11-140914 corresponding to U.S. patent application Ser. No. 09/574839, the present inventor et al. has proposed the following configuration: In a multi-operating system control apparatus for causing the plural OSs to be operated on one computer system, the plural OSs share an input/output device with which the computer is equipped.

In the mechanism disclosed in Japanese Patent Application No. 11-140914, there are provided a switching member for switching among the plural OSs and the plural display frames corresponding to the plural OSs, thereby making it possible to switch among the display frames in correspondence with the OS switching performed by the switching member.

The present invention is related with the above-described invention. Moreover, it is an object of the present invention to provide a display apparatus and a display method where plural and different OSs share and operate one display in different display environments, or to provide a navigation apparatus using the display method.

It is another object of the present invention to provide a member for changing, in correspondence with the OS switching, the display environments such as a color pallet (palette) and a color mode (i.e., an expression bit size of colors for each pixel, which means that the colors are displayed in, for example, 8 bits/pixel or 16 bits/pixel), thereby making the plural OSs usable under the different display environments.

Furthermore, it is still another object of the present invention to provide, instead of switching and displaying results expanded by the plural OSs, a member for displaying the expanded results on one and the same display simultaneously. One example of the member is a member for displaying, on one and the same display simultaneously, an OS (the 1st OS) for executing a predetermined processing and an OS (the 2nd OS) for executing a user interface processing.

In addition, it is an even further object of the present invention to provide a display apparatus or a navigation apparatus where the following function is possible: For example, when simultaneously executing an OS (the 1st OS) for displaying and expanding a map with the use of one and the same hardware resource and an OS (the 2nd OS) for displaying and expanding applications such as a mail or the GUI, the 1st OS expands the map in the color pallet and the color mode set specifically for displaying the map, and the 2nd OS displays the applications in various types of color pallets and color modes set by a developer of the applications such as the mail, a game, and Internet.

The above-described objects can be accomplished by providing the following configuration components in the display apparatus: A memory that is, for example, frame-divided so that the processed results are expanded in correspondence with the plural OSs, a display switching member for switching among the displays of the plural OSs, and a display environment changing member for changing, in correspondence with the corresponding OS, the display environments such as the color pallet and the color mode (i.e., an expression bit size of colors for each pixel, which means that the colors are displayed in, for example, 8 bits/pixel or 16 bits/pixel) and a display starting address in the memory.

Moreover, the above-described objects can be accomplished by providing the following configuration components: For example, plural memories designed to expand the processed results in correspondence with the plural OSs, the display environment changing member for changing, in correspondence with the corresponding OS, the display environments such as the color pallet, the color mode and the display starting address in the memory, and a superimposition-display member for displaying the plural frames in a state of being superimposed.

Furthermore, the above-described objects can be accomplished by providing the following configuration components: For example, the plural memories designed to expand the processed results in correspondence with the plural OSs, the display environment changing member for changing, in correspondence with the corresponding OS, the display environments such as the color pallet, the color mode and the display starting address in the memory, and a division-display member for dividing a display area of the display so as to display the plural frames on the display simultaneously.

Also, in the display apparatus and the display method where the results processed by the plural OSs are displayed on one and the same display, when plural graphics-drawing frames to be simultaneously displayed on the display are generated from the plural processed results, the above-described objects can be accomplished by setting a display environment in correspondence with the plural OSs of the processed results that correspond to a graphics-drawing frame to be generated next, the display environment being to be set for generating the plural graphics-drawing frames.

Also, the above-described objects can be accomplished by providing a display apparatus, including plural sensors for detecting a running state of a moving object, an information processing unit including at least a navigation function, the navigation function determining the present position of the moving object in accordance with a detected result obtained from the plural sensors, and an image processing unit for causing a display to display an image for indicating a processed result obtained in the information processing unit, wherein the information processing unit executes an information processing with the use of plural OSs, the image processing unit causing the display to simultaneously display an image for indicating plural processed results obtained by the plural OSs.

DETAILED DESCRIPTION OF THE EMBODIMENTS

Hereinafter, employing as an example the case where the present invention is applied to a navigation apparatus, the explanation will be given concerning an embodiment of a display apparatus in the present invention.

Figure 1:
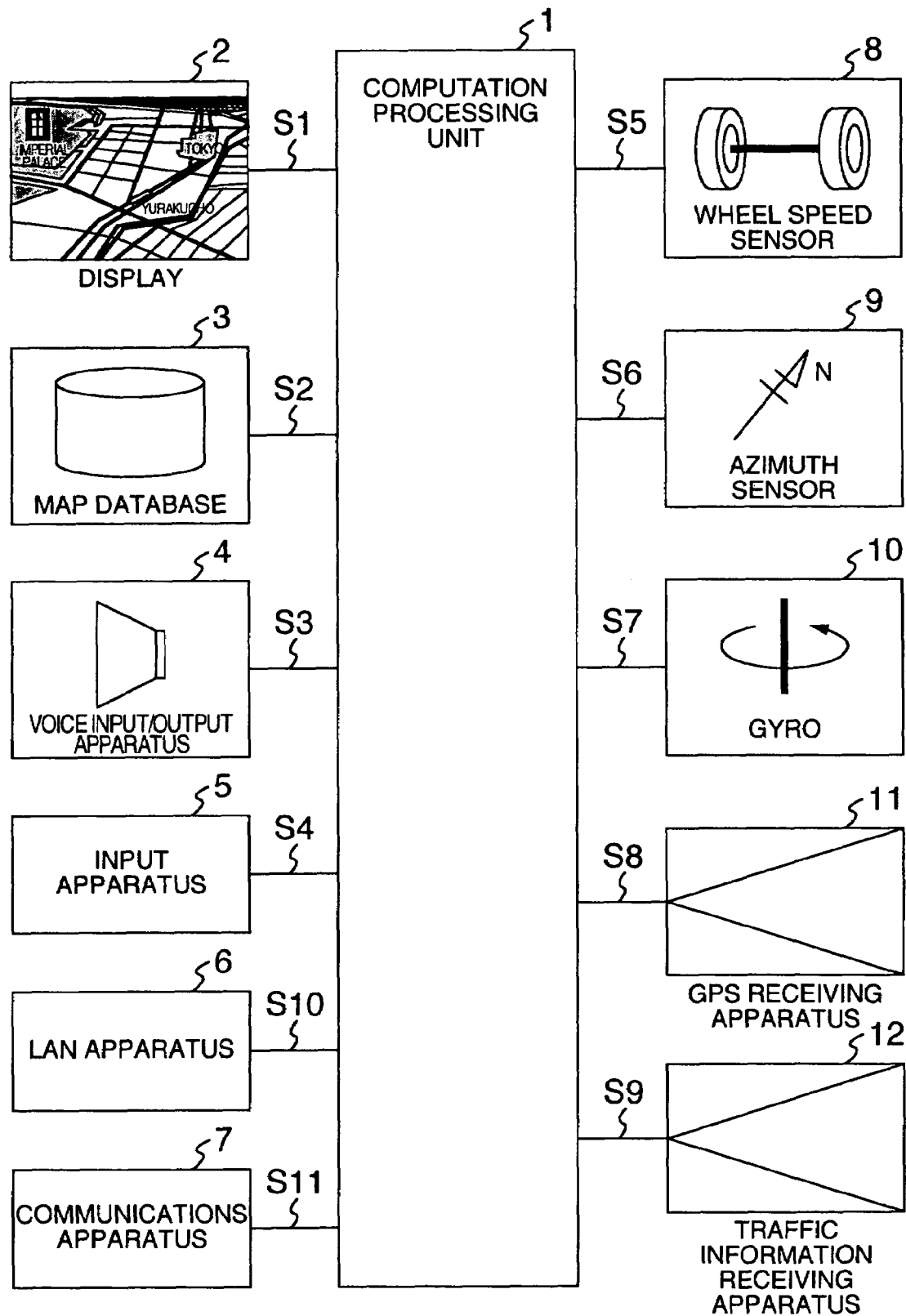
FIG. 1 is a block diagram for illustrating the respective configuration units of a navigation apparatus to which a display apparatus according to the present invention has been applied.

FIG. 1 illustrates the respective configuration units of the navigation apparatus.

A computation processing unit (1) is a central unit for performing variety types of processings the examples of which are as follows: The computation processing unit detects the present location of a user's own car in accordance with information outputted from various types of sensors (8) to (11). Then, based on the present position information obtained, the unit reads, from a map database (3), map information necessary for the display, then graphics-expanding the map information. Next, the unit displays, on a display (2), the present location of the user's own car detected from the sensors (8) to (11) in such a manner that the present location is superimposed on the graphics-expanded map as a present-point mark. Otherwise, the computation processing unit calculates an optimum route connecting the present location to a point (i.e., for example, a destination) that the user has specified using an input apparatus (5). Then, the unit informs the user of the optimum route through a voice input/output apparatus (4) or the display (2), thus guiding the user along the route.

The display (2) is a unit for displaying the graphics information generated by the computation processing unit (1). As the display (2), there is generally used an apparatus such as a CRT and a liquid crystal display. A signal S1 between the computation processing unit (1) and the display (2) is commonly connected by a signal such as a RBG signal, a NTSC (National Television System Committee) signal, and a PAL (Phase Alternation by Line) signal.

The map database (3), which includes a large-capacity storage medium such as a CD-ROM, an IC card, and a DVD (Digital Video Disk), performs reading-out/writing-in processings of map data required.

Also, the voice input/output apparatus (4) performs a processing of converting a message for the user into a voice signal so as to output the voice signal, the message being generated by the computation processing unit (1), and performs a processing of recognizing a voice that the user issues and transferring its content to the computation processing unit (1). The input apparatus (5) is a unit for receiving an instruction from the user. As the input apparatus (5), there is commonly used a hand switch such as a scroll key and a scale-varying key, a joy stick, or a touch panel.

The sensors for detecting the location in the moving object navigation are as follows: The wheel censor (8) for measuring the distance from the product of a circumference of the wheel and the counted number of revolutions of the wheel, the azimuth censor (9) for detecting the magnetic field that the Earth holds so as to detect a direction in which the moving object is heading, the gyro (10) such as an optical fiber gyro or an oscillation gyro for detecting an angle by which the moving object has been rotated, and the GPS receiving apparatus (11). The GPS receiving apparatus receives a signal from a GPS satellite so as to measure, concerning 3 or more of the GPS satellites, a distance between the moving object and a GPS satellite and a variation ratio of the distance, thereby measuring the present location, the heading direction and the heading azimuth of the moving object.

Moreover, there are provided a beacon transmitter for sending real time information and a traffic information receiving apparatus (12) for receiving a signal sent from FM multiplex broadcast. Examples of the real time information are information on a road's traffic-congestion, regulation information such as a notice of a construction and a notice of being closed to the traffic, and parking lot information.

Furthermore, there are provided an in-car LAN apparatus (6) and a communications apparatus (7). The in-car LAN apparatus receives various information on the car body, i.e., for example, open/close information on a door, a light-lit up situation, and a condition of the engine and a result of its trouble diagnosis. Based on the connection with an appliance such as a portable cordless telephone or a PHS, the communications apparatus is designed to request and receive, from an information center, information that the user wishes to obtain, i.e., for example, information on a restaurant, a hotel or the like in an arbitrary point.

Incidentally, the configuration of the navigation apparatus given in the present embodiment is just one example. A navigation apparatus designed in another configuration is also allowable as long as it includes a characteristic configuration characteristic of the present invention that will be illustrated later in FIG. 3.

Figure 2:
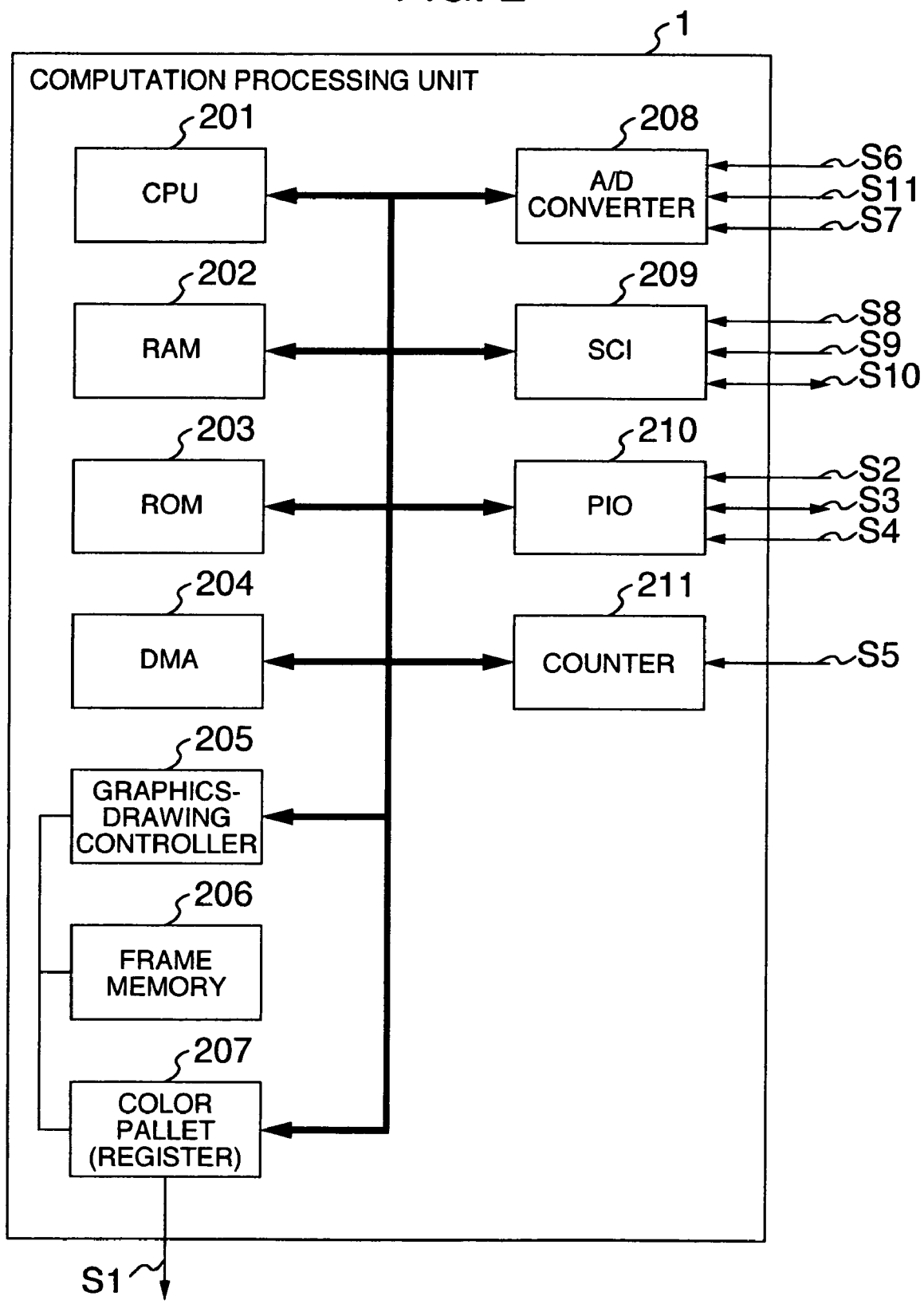
FIG. 2 is a hardware configuration diagram of a computation processing unit.

FIG. 2 is a diagram for explaining a hardware configuration of the computation processing unit (1). Hereinafter, the explanation will be given concerning the respective configuration components.

The computation processing unit (1) has a configuration where a bus connects the respective devices with each other. The respective configuration components are as follows: A CPU (201) for executing various processings such as performing numerical computations and controlling the respective devices, a RAM (202) for temporarily storing the map and computation data, a ROM (203) for storing a program and data, a DMA (Direct Memory Access) (204) for executing data transfer at a high-speed between memories and between a memory and each device, a graphics-drawing controller (205) for controlling a writing-in into a frame memory (206), the frame memory (206) for storing graphics image data obtained by expanding vector data into pixel information, a color pallet (207) for converting the image data into the RBG signal, an analogue/digital converter (208) for converting an analogue signal into a digital signal, a SCI (serial communication interface) (209) for converting a serial signal into a parallel signal synchronized with a bus, a PIO (parallel input/output) (210) for synchronizing the parallel signal so as to load it onto the bus, and a counter (211) for integrating a pulse signal.

Figure 3:
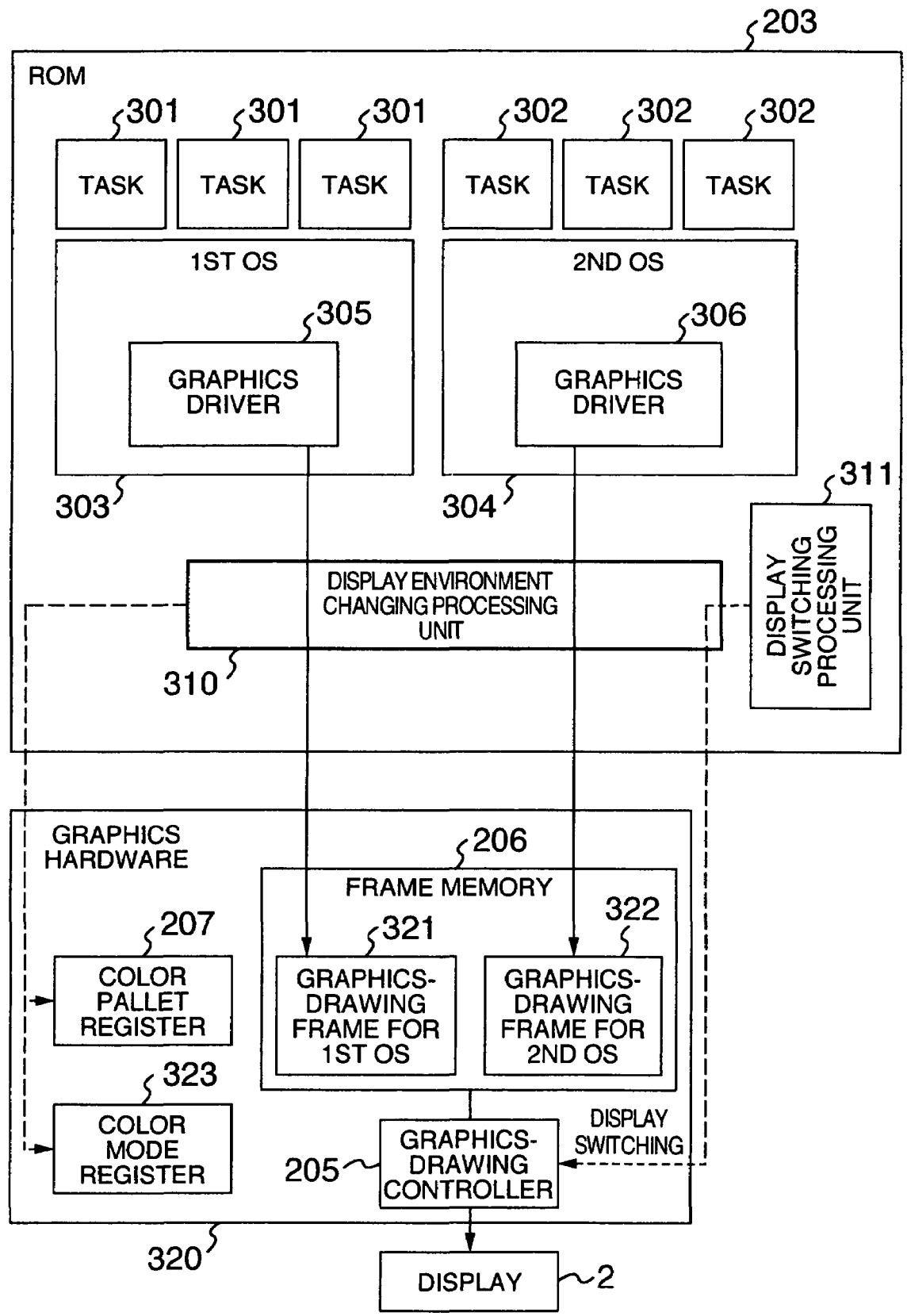
FIG. 3 is a functional block diagram for illustrating the 1st embodiment according to the present invention.

FIG. 3 is a functional block diagram for explaining the 1st embodiment according to the present invention.

The navigation apparatus explained in FIG. 1, based on a time sharing by the CPU (201), operates the 1st OS (303) and the 2nd OS (304) simultaneously, then displaying the results on one and the same display. Each of the OSs executes each of tasks (301) to (302), using memory and processor resources assigned to each of them. Although, in FIG. 3, there is illustrated an example where the number of the simultaneously operated OSs is 2 and the number of the tasks operated by each OS is 3, it is also possible to implement the OSs and the tasks the numbers of which are larger or smaller than these values. Also, although, in the present embodiment, no assumption is made concerning the dynamical change of the number of the OSs, it is also possible for each OS to dynamically generate or delete the tasks.

The respective graphics drivers (305) and (306) in the OSs (303) and (304) transfer, to a graphics hardware (320), the results obtained by processing the respective tasks (301) to (302) of the OSs (303) and (304).

Here, a display environment changing processing unit (display environment changer) (310) is a member for changing a display environment of the 1st OS (hereinafter, OS1) and a display environment of the 2nd OS (hereinafter, OS2). Concretely speaking, in the case of the OS1, the color pallet and the color mode that the OS1 uses are set into each of registers, i.e., a color pallet register (207) and a color mode register (323) in the graphics hardware (320). In the case of the OS2, the color pallet and the color mode that the OS2 uses are set into each of the registers.

The color mode is a manner of expressing the colors for each pixel. For example, in 8 bits/pixel, the colors can be set with a color pallet of 256 colors, and in 16 bits/pixel, it can be set with a color pallet of RGB. The expression number of the colors for each pixel is allowed to be larger or smaller than the 8 bits or the 16 bits.

Furthermore, in the frame memory (206), frame areas assigned in advance are used as a graphics-drawing frame (321) for the OS1 and a graphics-drawing frame (322) for the OS2. The above-described frame switching is made possible by changing a predetermined register in the graphics-drawing controller (205). The display environment changing processing unit (310), in the case of the OS1, sets a transfer starting address to the frame into the graphics-drawing frame (321) for the OS1, and in the case of the OS2, sets the transfer starting address into the graphics-drawing frame (322) for the OS2.

The above-described display switching is performed by, for example, a user inputting. At this time, a display switching processing unit (display switch) (311) informs the display environment changing processing unit (310) of the display switching based on the user inputting. Then, the display environment changing processing unit (310) sets, into the predetermined register in the graphics hardware (320), the display environments such as the color pallet and the color mode that correspond to the OS to which the switching has been performed.

In the present embodiment, there has been presented the following example: The program stored in the ROM (203) implements the OS1 (303), the OS2 (304), the tasks (301) to (302), the graphics drivers (305), (306), the display environment changing processing unit (310), and the display switching processing unit (display switch) (311), and in addition, the graphics hardware (320) implements the color pallet register (207), the color mode register (323), the frame memory (206), and the graphics-drawing controller (205). The method of implementing the characteristic configuration of the present invention, however, need not be limited to the above-described program and graphics hardware: For instance, a configuration is also allowable where the display environment changing processing unit (310) and the display switching processing unit (311) are mounted on the graphics hardware (320).

Figure 4:
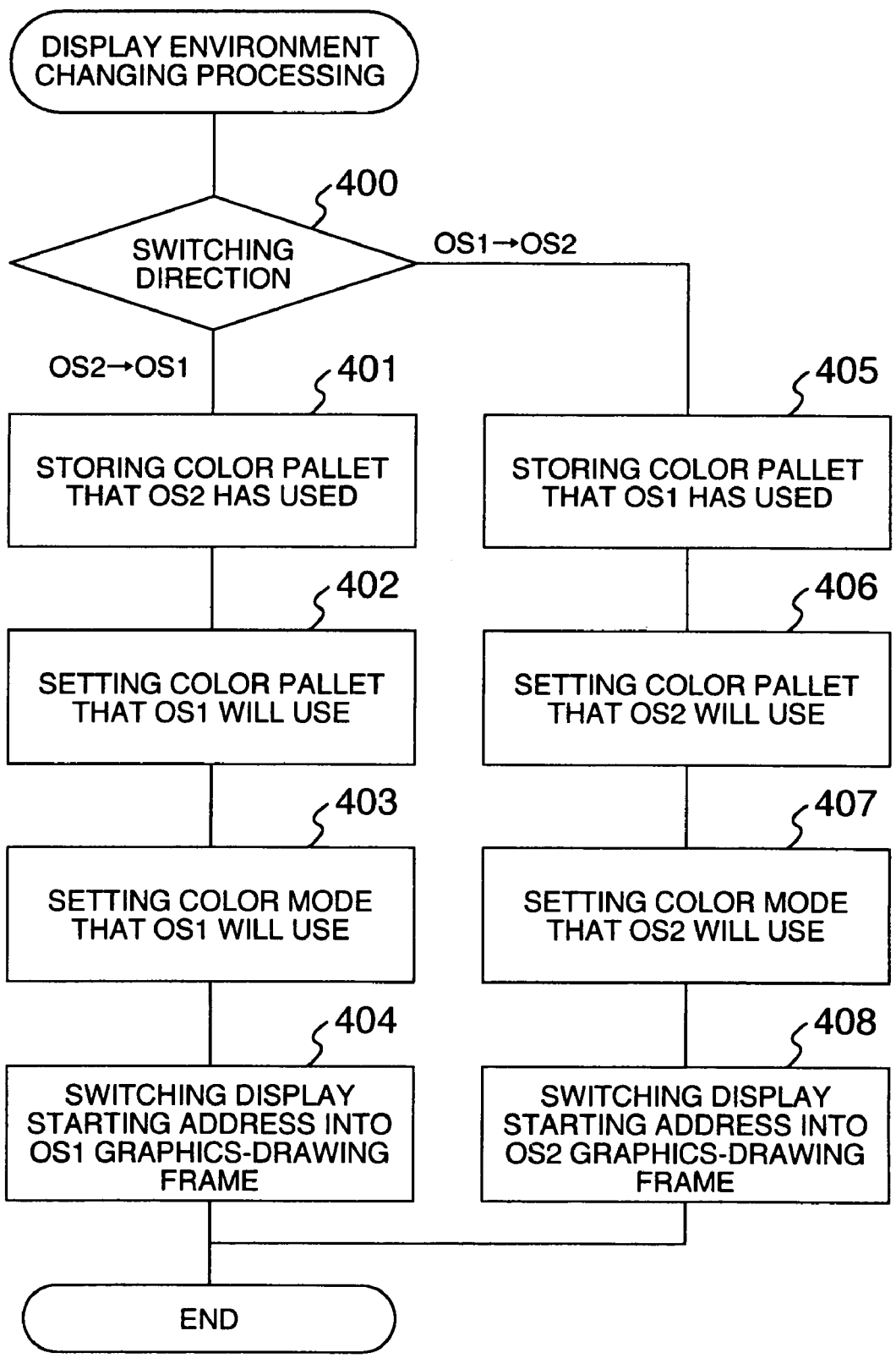
FIG. 4 is a flow chart for illustrating the details of a processing in a display environment changing processing unit.

FIG. 4 is a flow chart for explaining the processing of performing the switching between the display of the OS1 and that of the OS2.

First, in response to the instruction from the display switching processing unit (311), a switching direction of the display is judged (a processing 400). When a picture displayed at present is of the OS2 and the switching to the OS1 is to be executed, an OS2 displaying color pallet that is being used at present is read from the color pallet register (207) and is stored into the RAM (202) (a processing 401). Next, a color pallet that the OS1 will use is set into the color pallet register (207) (a processing 402). Moreover, a color mode that the OS1 will use is set into the color mode register (323) (a processing 403). Finally, a display starting address register in the graphics-drawing controller (205) is changed into the graphics-drawing frame for the OS1 (a processing 404).

Meanwhile, in (the processing 400), in the case of switching the display from the display of the OS1 to that of the OS2, an OS1 displaying color pallet that is being used at present is read from the color pallet register (207) and is stored into the RAM (202) (a processing 405). Next, a color pallet that the OS2 will use is set into the color pallet register (207) (a processing 406). Moreover, a color mode that the OS2 will use is set into the color mode register (323) (a processing 407). Finally, the display starting address register is changed into the graphics-drawing frame for the OS2 (a processing 408), thereby terminating the display switching processing.

Figure 5:
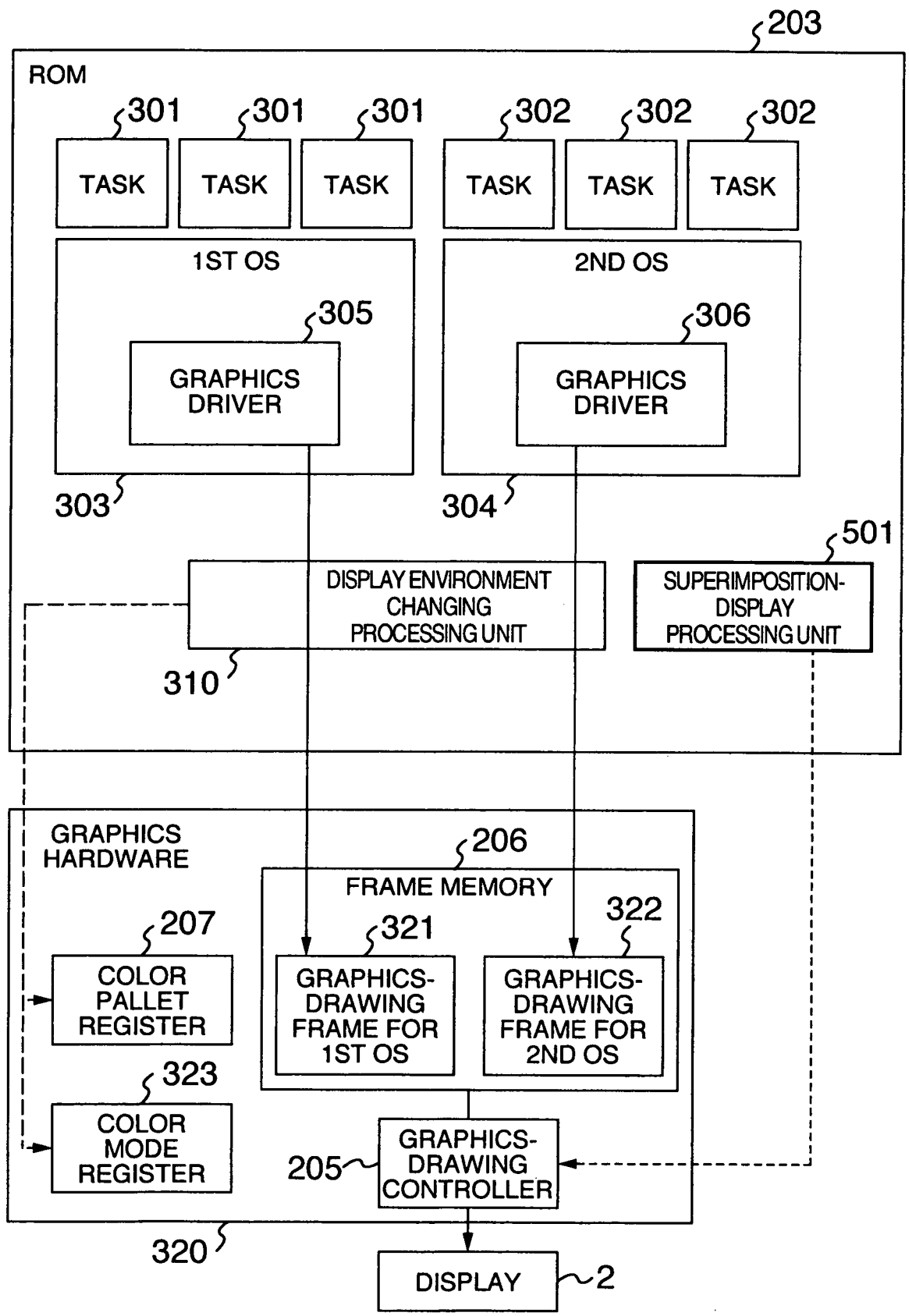
FIG. 5 is a functional block diagram for illustrating the 2nd embodiment according to the present invention.

FIG. 5 is a functional block diagram for explaining the 2nd embodiment according to the present invention.

The difference between the present embodiment and the above-described 1st embodiment lies in a point of providing a superimposition-display processing unit (display superimposer) (501) instead of the display switching processing unit (311) in the 1st embodiment. The configuration components that are the same as those in the 1st embodiment will be given the same reference numerals, and thus the detailed explanation thereof will be omitted.

The superimposition-display processing unit (501) changes a predetermined register in the graphics-drawing controller (205) so that the graphics-drawing frame (321) for the OS1 and the graphics-drawing frame (322) for the OS2 are displayed in a state of being superimposed on each other. As is the case with the display environment changing processing unit (310) explained in the 1st embodiment, the CPU (201), for example, executes the program stored in the ROM (203), thereby implementing the superimposition-display processing unit (501).

Figure 6:
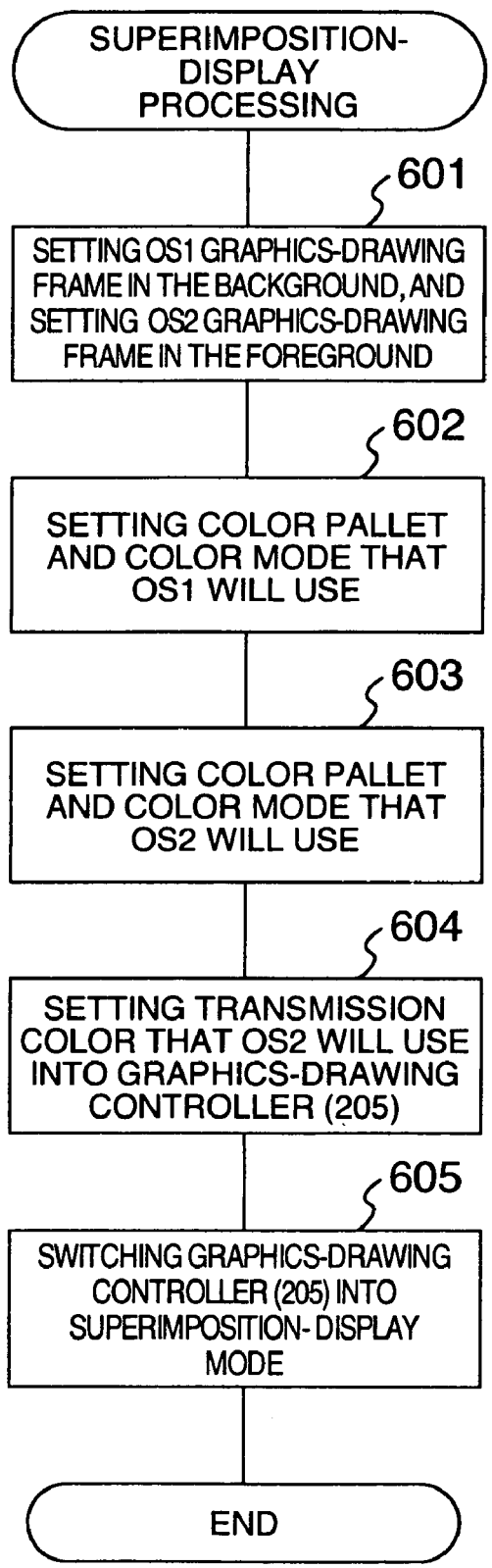
FIG. 6 is a flow chart for illustrating the details of a processing in a superimposition-display processing unit.

FIG. 6 illustrates an example of the processing in the superimposition-display processing unit (501).

In the present example, the OS1 graphics-drawing frame (321) is set in the background, and the OS2 graphics-drawing frame (322) is set in the foreground (a processing 601). Then, a color pallet and a color mode at the time of being expanded into the OS1 graphics-drawing frame (321) are set into the color pallet register (207) and the color mode register (323) (a processing 602). Next, a color pallet and a color mode at the time of being expanded into the OS2 graphics-drawing frame (322) are set into the color pallet register (207) and the color mode register (323) (a processing 603). Moreover, a specified color that the OS2 will use is set to be a transmission color into the graphics-drawing controller (205) (a processing 604). Finally, the predetermined register in the graphics-drawing controller (205) is set so that the OS1 graphics-drawing frame (321) and the OS2 graphics-drawing frame (322) are displayed in a state of being superimposed on each other (a processing 605).

In FIG. 6, there has been illustrated the example where the specified color is designated as the transmission color so as to display the OS1 and the OS2 graphics-drawing frames in the state of being superimposed. Furthermore, there exists a method where, providing a table for determining a display color at the time when the frames are superimposed, the display color at the time when the frames are superimposed is determined using the table. In accordance with a flow chart in FIG. 7, the explanation will be given below concerning an example thereof.

Figure 7:
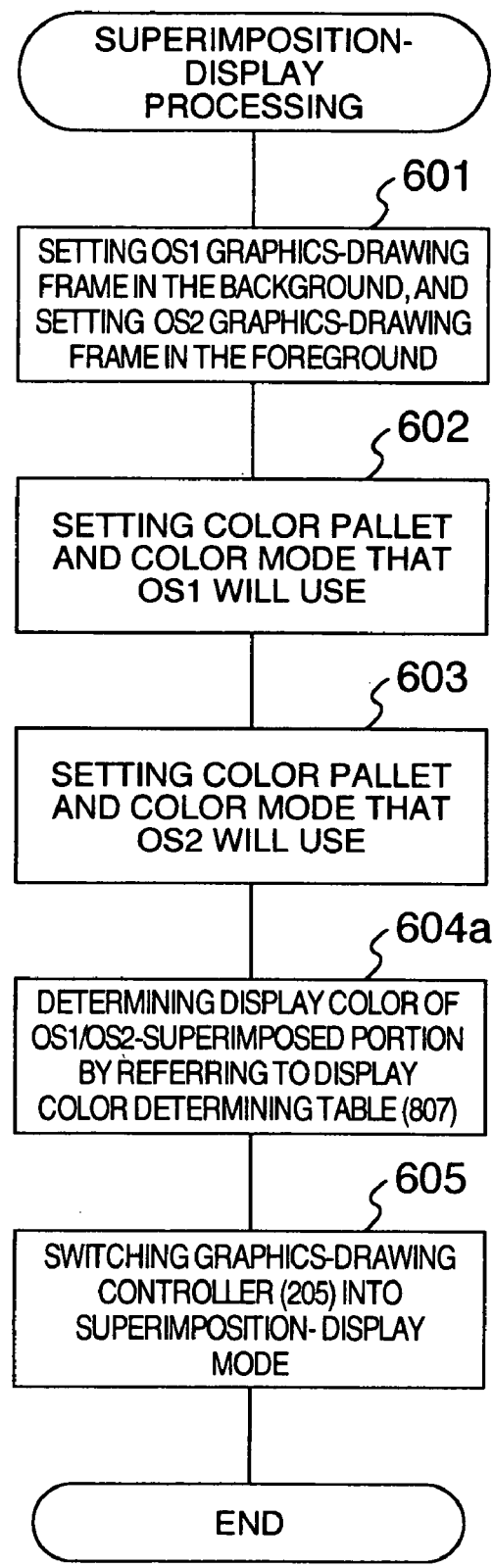
FIG. 7 is a flow chart for illustrating the details of another processing in the superimposition-display processing unit.

FIG. 7 illustrates, in the superimposition-display processing (501), the processing steps at which, using the table (hereinafter, referred to as a display color determining table) for determining the display color at the time when the OS1 and the OS2 graphics-drawing frames are superimposed, the display color at the time when the frames are superimposed is determined.

In much the same way as the steps in FIG. 6, the display environments of the OS1 and the OS2 are set (processings 601 to 603). Concerning a portion where the OS1 and the OS2 are displayed in the state of being superimposed, the display color of the superimposed portion is determined referring to the display color determining table (807) (a processing 604a).

Figure 8:
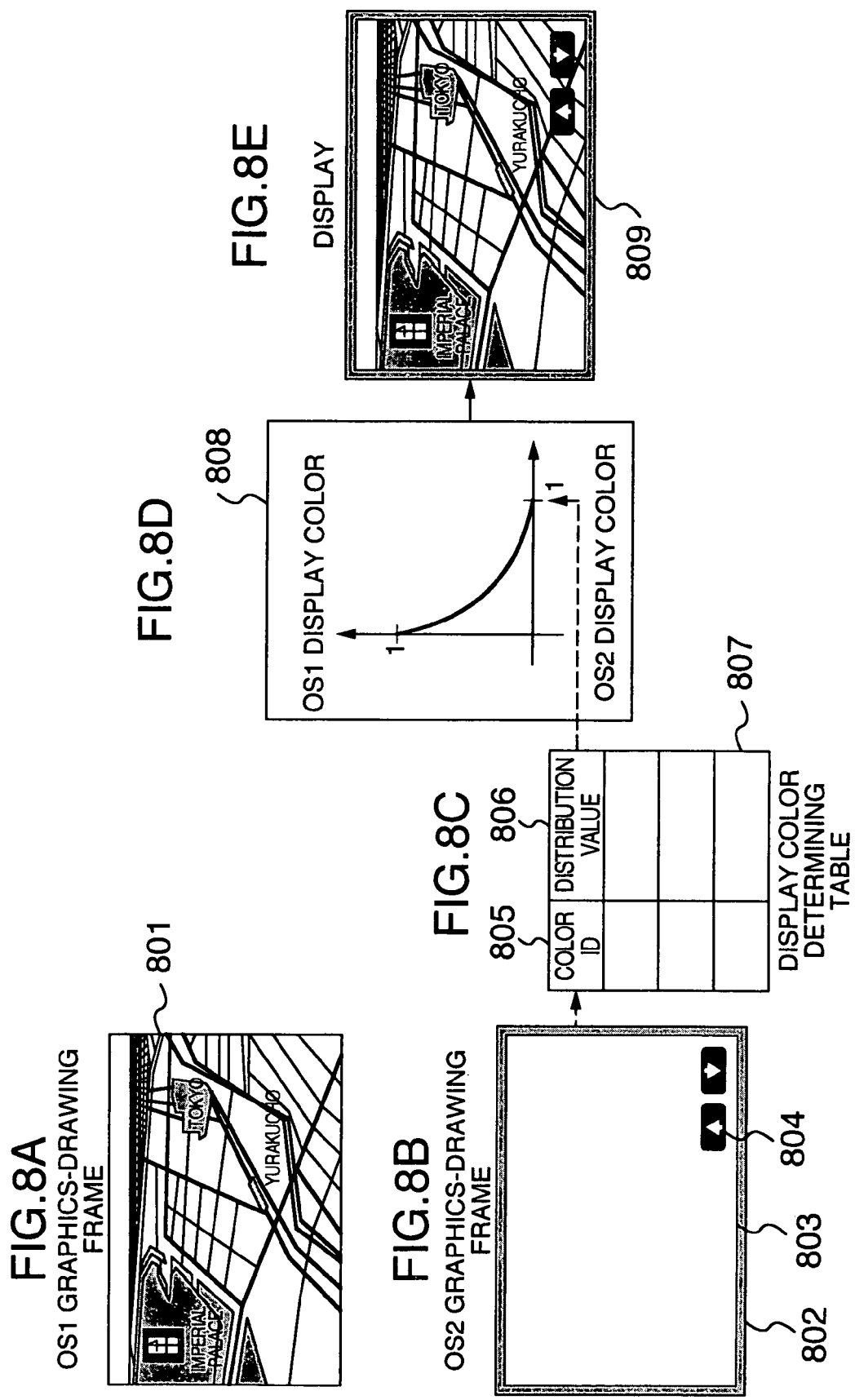
FIGS. 8A to 8E are supplementary diagrams for explaining the flow chart in FIG. 7.

FIGS. 8A to 8E are supplementary diagrams for explaining (the processing 604a). FIGS. 8A to 8E illustrate an example of the following processings: A result obtained by executing a navigation processing in the OS1 is displayed and expanded into an OS1 graphics-drawing frame (801) (: FIG. 8A), the navigation processing displaying a map on the periphery of the present location of a moving object. At the same time, a result obtained by executing a user interface processing in the OS2 is displayed and expanded into the OS2 graphics-drawing frame (802) (: FIG. 8B), the user interface processing being intended for displaying a window (803) and buttons (804) for prompting a user inputting. It is assumed that the entire frame areas are superimposed on each other with the OS1 graphics-drawing frame (801) set in the background and with the OS2 graphics-drawing frame (802) set in the foreground. A display color of a predetermined pixel in the superimposed portion is determined as follows: A distribution value (806) of a color is referred to from a color index. (a RBG parameter is also allowable) of the predetermined pixel in the superimposed portion, and a display color of the OS1 and that of the OS2 are synthesized with each other in accordance with the distribution value (806), thereby determining the display color of the predetermined pixel as is given by the following formula (1):

synthesized display color=OS1 display color×(1−OS2 distribution value)+OS2 display color×OS2 distribution value                                                                  (1)

As illustrated in a graph (808: FIG. 8D), the distribution value (806) presents a ratio between the display colors of the respective OSs with the use of a parameter in the range of 0 to 1. For example, when wishing to make the display color of the OS1 ineffective and to draw only the display color of the OS2, the distribution of the OS2 in the display color determining table (807: FIG. 8C) is set to be 1.

The above-described steps make it possible to display, with the map expanded into the OS1 graphics-drawing frame set in the background, the user interface such as the input buttons expanded into the OS2 graphics-drawing frame in such a manner that the user interface is superimposed on the map (809: FIG. 8E).

Incidentally, in the present embodiment, the explanation has been given concerning the method of displaying the picture of the map and that of the user interface in the state of being superimposed on each other. Other than these pictures, however, it is also allowable to employ a configuration of displaying various information and pictures in the state of being superimposed on each other. Examples of such various information and pictures are as follows: Information on the stores obtained from the communications apparatus (7), the traffic information obtained from the traffic information receiving apparatus (12), the results obtained by the voice recognition processing or a voice synthesis processing performed by the voice input/output apparatus (4), the car body information obtained from the LAN apparatus, such as the remaining quantity of the fuel, the brake and the velocity, and moving picture reproducing frames in systems such as MPEG (Moving Picture Experts Group/Moving Picture Image Coding Experts Group).

Figure 9:
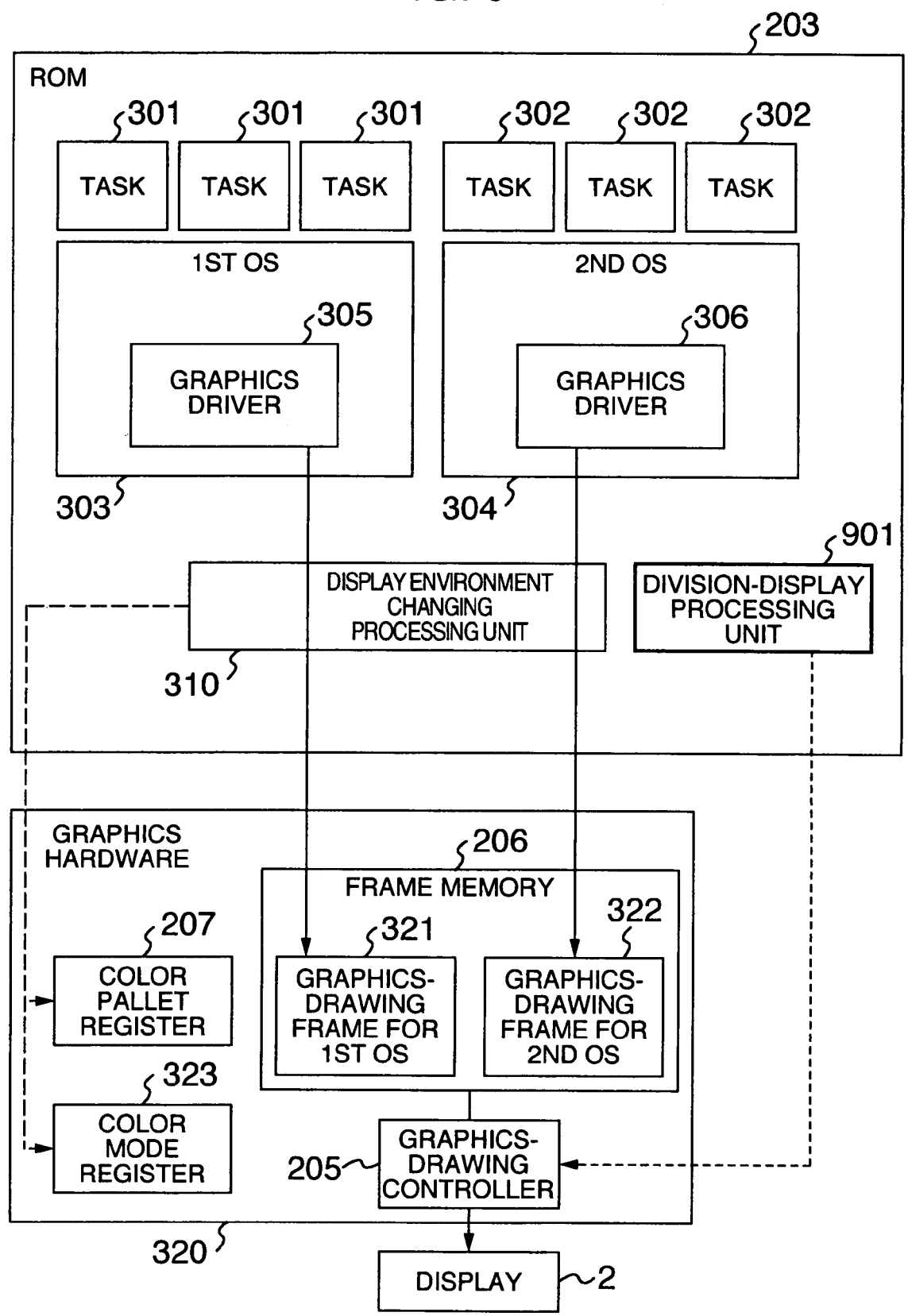
FIG. 9 is a functional block diagram for illustrating the 3rd embodiment according to the present invention.

FIG. 9 is a functional block diagram for explaining the 3rd embodiment according to the present invention.

The difference between the present embodiment and the above-described 1st embodiment lies in a point of providing a division-display processing unit (display area divider) (901) instead of the display switching processing unit (311) in the 1st embodiment. The configuration components that are the same as those in the 1st embodiment will be given the same reference numerals, and thus the detailed explanation thereof will be omitted.

The division-display processing unit (901) changes a predetermined register in the graphics-drawing controller (205) so that the OS1 graphics-drawing frame (321) and the OS2 graphics-drawing frame (322) are displayed in such a manner that the two graphics-drawing frames are divided onto the display (2).

Figure 10:
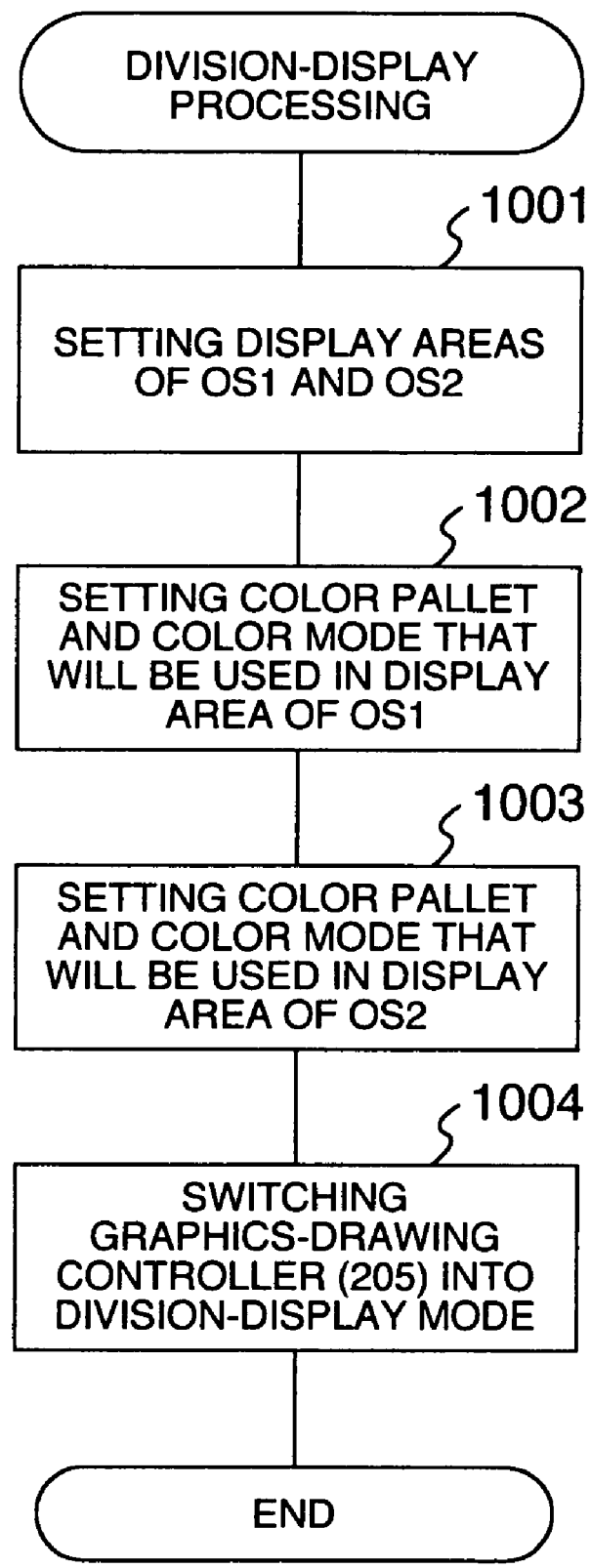
FIG. 10 is a flow chart for illustrating the details of a processing in a division-display processing unit.

FIG. 10 is a flow chart for illustrating the processing steps of the division-display processing unit (901). Display areas (display coordinates) of the OS1 and of the OS2 in the display (2) are set into a predetermined register in the graphics-drawing controller (205) (a processing 1001). Then, a color pallet and a color mode that the OS1 will use and a color pallet and a color mode that the 0S2 will use are set into the color pallet register (207) and the color mode register (323) (processings 1002 to 1003). Finally, the graphics-drawing controller (205) is switched into a division-display mode (a processing 1004).

Figure 11:
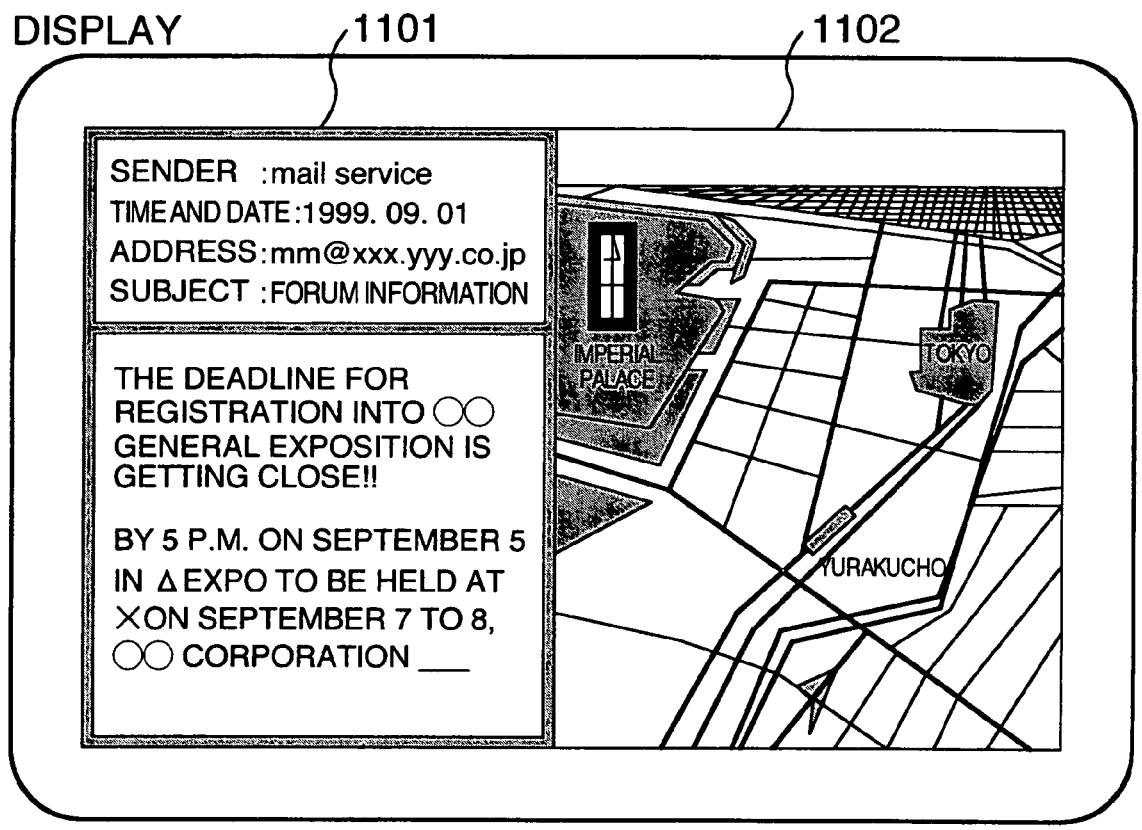
FIG. 11 is an explanatory diagram for explaining an example of a display obtained as a result of executing the flow chart in FIG. 10.

FIG. 11 illustrates an example where the execution results of the OS1 and of the OS2 are displayed simultaneously on the display by the present division-display processing. In FIG. 11, a display picture (1101) represents an example of the result obtained by executing a mail function in the OS2, and a display picture (1102) represents an example of the result obtained by executing, in the OS1, the navigation function for displaying the map on the periphery of the moving object.

Figure 12:
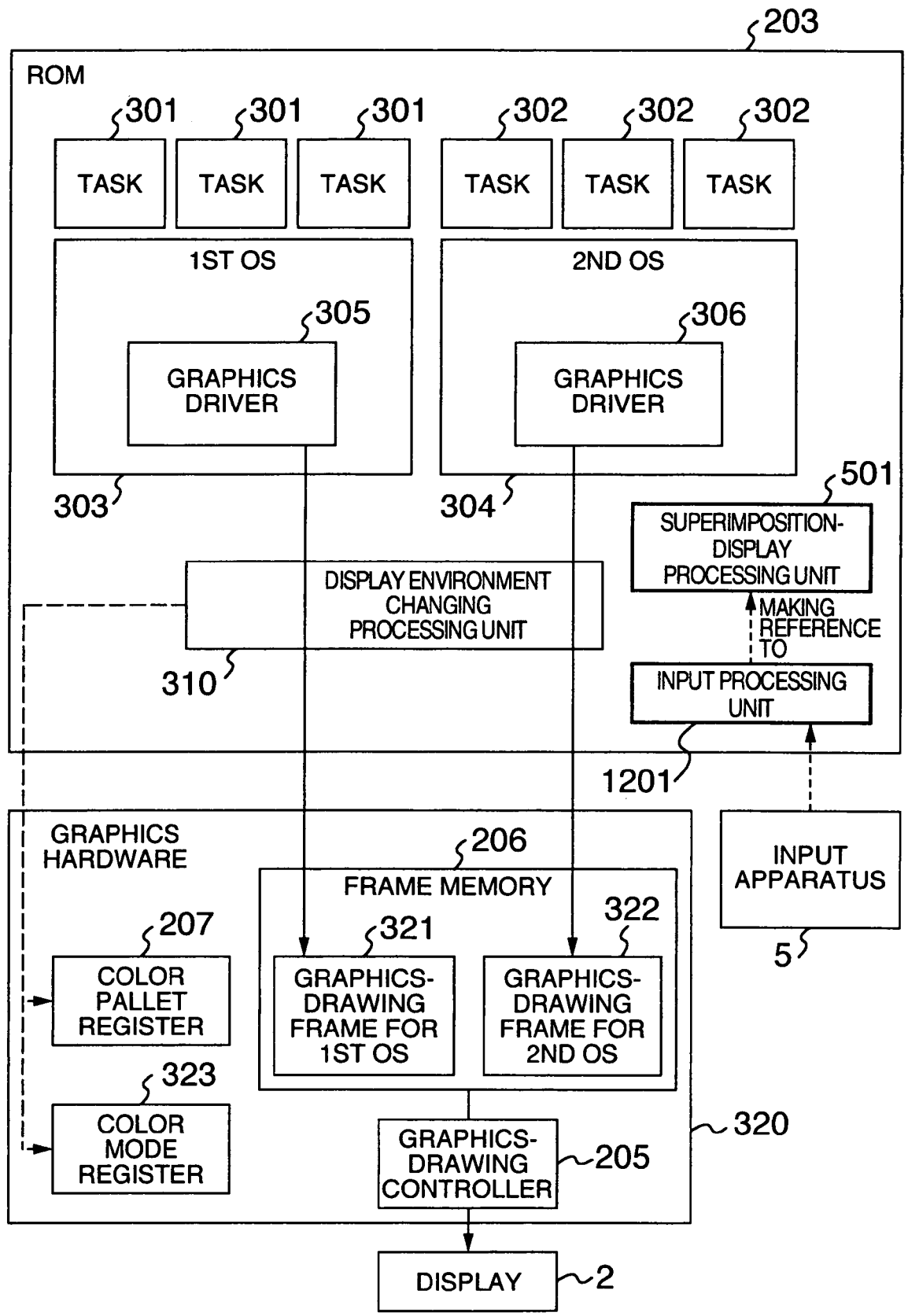
FIG. 12 is a functional block diagram for illustrating the 4th embodiment according to the present invention.

FIG. 12 is a functional block diagram for explaining the 4th embodiment according to the present invention.

In the present embodiment, an input processing unit (input device) (1201) is added to the above-described 2nd embodiment illustrated in FIG. 5, thereby making it possible to allocate and transfer a user inputting to a predetermined OS in correspondence with the display modes of the plural OSs. The method therefor will be explained below.

Figure 13:
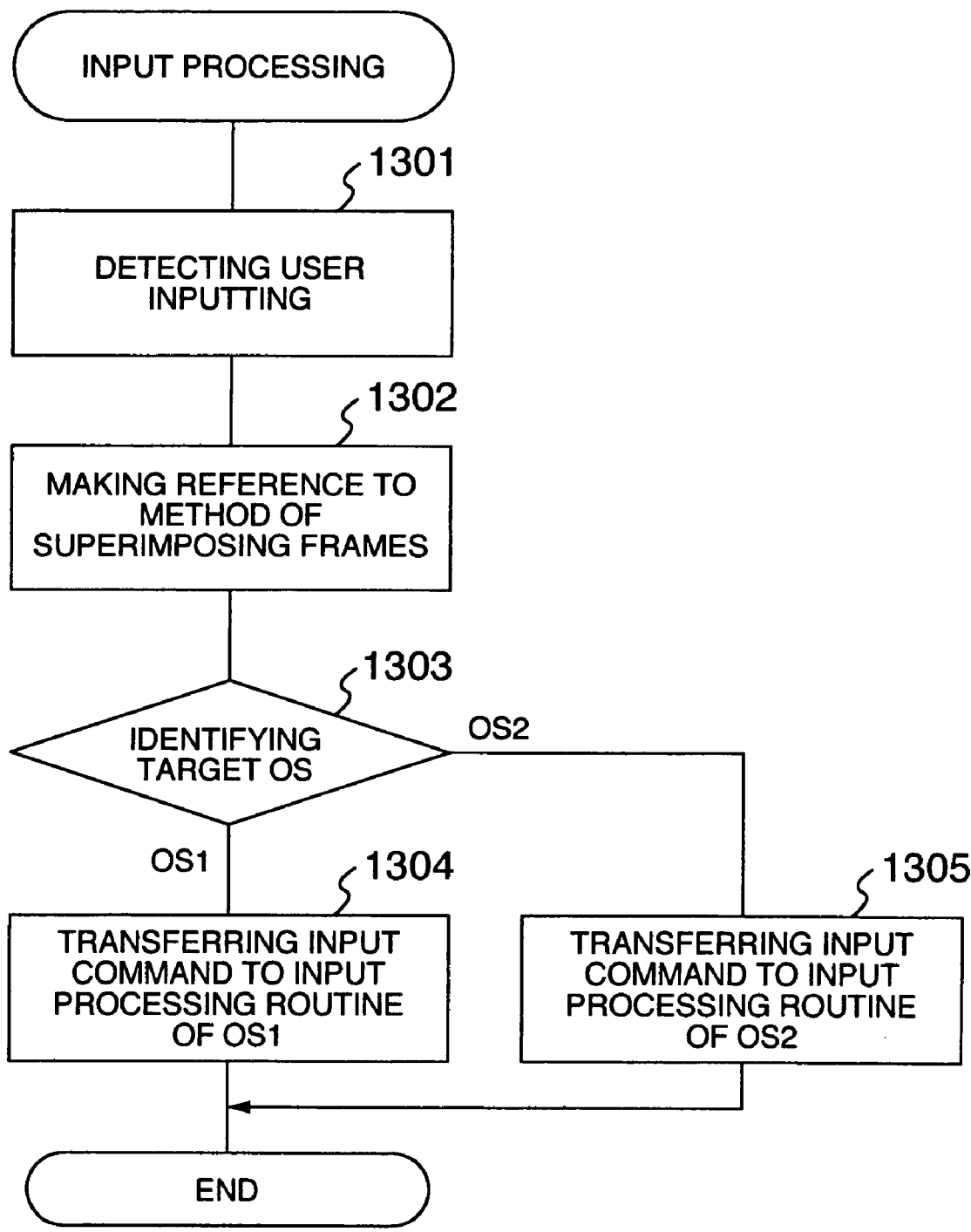
FIG. 13 is a flow chart for illustrating the details of a processing in an input processing unit.

FIG. 13 is a flow chart for illustrating the processing steps in the input processing unit (1201). Also, FIGS. 14A to 14D and FIG. 15 are supplementary diagrams for explaining the flow chart in FIG. 13.

In FIG. 13, at first, the input processing unit (1201) detects a user inputting from the input apparatus (5) such as the keys, a remote controller and the touch panel (a processing 1301). Next, the input processing unit makes reference to the superimposition-display processing unit (501) (a processing 1302). The superimposition-display processing unit (501) has displayed the graphics-drawing frames for the plural OSs and the user interface such as the buttons for prompting the user inputting/outputting in such a manner that the frames and the buttons are superimposed on each other. Comparing display positions of the buttons with a position at which the user has performed the inputting through the keys, the remote controller and a pointing device such as a mouse, the input processing unit identifies which button has been selected, and judges to which OS of the OS1 and the OS2 the identified button is effective (a processing 1303). Using FIGS. 14A to 14D, the concrete explanation will be given below concerning the processing 1303.

Figure 14A:
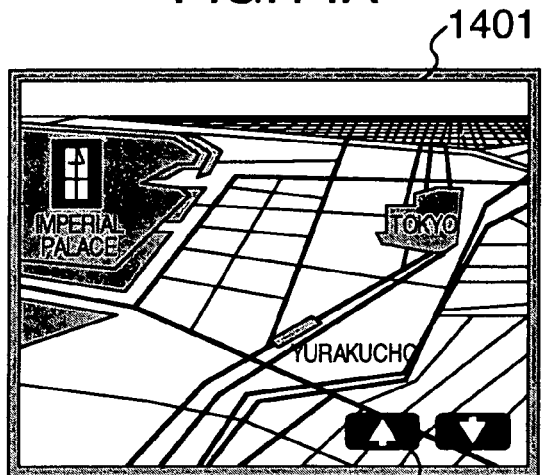
FIGS. 14A to 14D are supplementary diagrams for explaining the flow chart in FIG. 13.
Figure 14B:
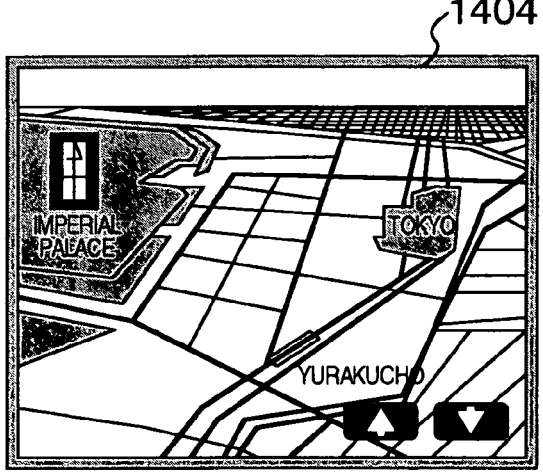

In a display example (1401) in FIG. 14A, the superimposition-display processing unit (501) sets the OS1 graphics-drawing frame in the background, and sets the OS2 graphics-drawing frame in the foreground. The map is displayed in the background, and buttons (1402) for prompting a user inputting/outputting are displayed in the foreground. In this state, if, for example, a "↓" button (1402) is pushed down, the input processing unit (1201) judges the user inputting to be the inputting into the OS1, then transferring the user inputting to the OS1 (a processing 1304). The OS1, in a predetermined task, executes a predetermined processing toward the user inputting (which, in this case, is a processing of scrolling the map in a downward direction) (a processing 1404: 14B).

Figure 14C:
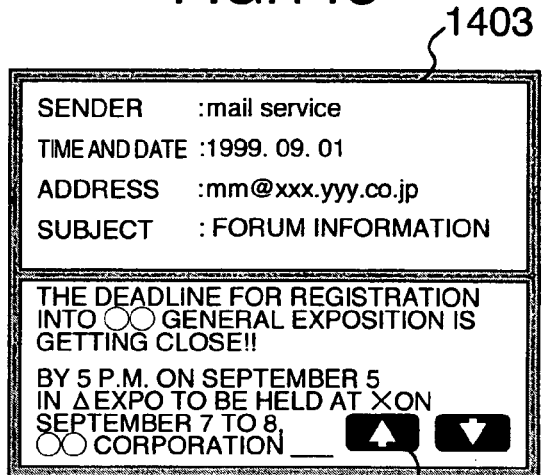
Figure 14D:
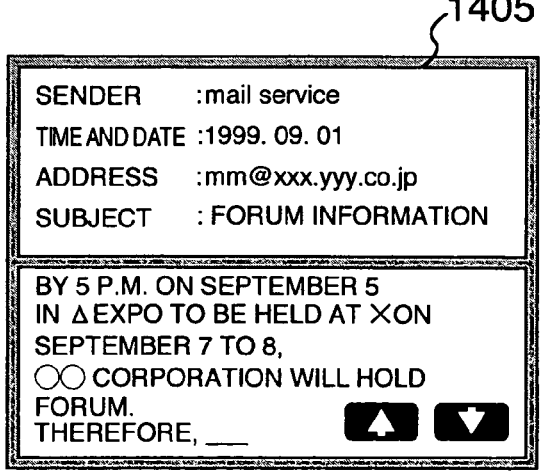

Meanwhile, in a display example (1403) in FIG. 14C, the superimposition-display processing unit (501) sets the OS2 graphics-drawing frame in both the background and the foreground. In this state, if the "↓" button (1402) is pushed down, the input processing unit (1201) judges the user inputting to be the inputting into the OS2, then transferring the user inputting to the OS2 (a processing 1305). The OS2, in a predetermined task, executes a predetermined processing toward the user inputting (which, in this case, is a processing of scrolling the content of the mail in a downward direction) (a processing 1405: 14D).

Moreover, using FIG. 15, the explanation will be given below concerning one more concrete example of the above-described processing 1303.

Figure 15:
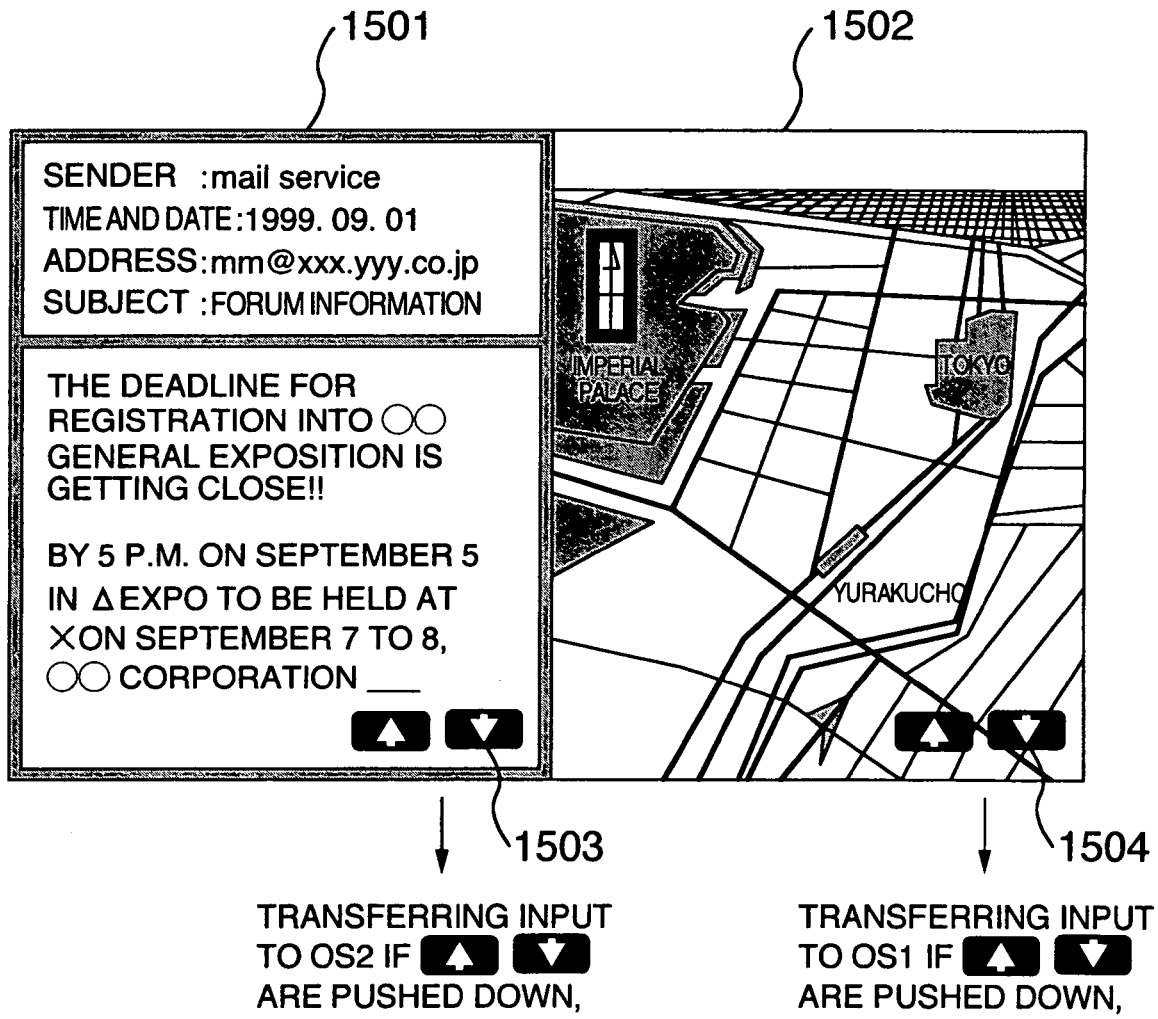
FIG. 15 is a supplementary diagram for explaining the flow chart in FIG. 13.

FIG. 15 illustrates a display example where the OS1 graphics-drawing frame and the OS2 graphics-drawing frame are displayed in such a manner that the two graphics-drawing frames are divided onto the display, and further buttons (1503), (1504) expanded into the OS2 are displayed in a state of being superimposed on the divided picture. A display picture (1501) represents the result obtained by executing the mail function in a predetermined task of the OS2, and a display picture (1502) represents the result obtained by executing the navigation function in a predetermined task of the OS1. The input processing unit (1201) makes reference to the superimposition-display processing unit (501) so as to recognize the display areas of the OS1 and of the OS2. Then, if the button (1503) is pushed down, the input processing unit transfers, to the OS2, a user inputting that the button has been pushed down (a processing 1305). If the button (1504) is pushed down, the input processing unit transfers, to the OS1, the user inputting that the button has been pushed down (a processing 1304).

As having been described so far, in the respective embodiments of the present invention, the explanation has been given concerning the processing of changing the display environments, employing as the examples the color pallet, the color mode, and the frame address. The display environment changing processing in the present invention, however, is not limited to the above-described processing. For instance, a configuration of executing the changing processing that is the same as the respective embodiments is also possible concerning a display environment related to the execution of the other display processing one example of which is as follows: An OS for processing, with the use of programs, processings such as a rendering processing of a plane or a line and a coordinate transformation and an OS for processing the processings by issuing commands to the hardware are operated simultaneously, and the execution mode (program/command) of the processings is switched in correspondence with the respective OSs.

Furthermore, in the above-described respective embodiments, the explanation has been given regarding the example of applying, to the navigation apparatus, the display-apparatus in the present invention where the results processed by the plurality of operating systems are displayed on one and the same display. The present invention, however, is also applicable to apparatuses other than the navigation apparatus, such as terminals for the industry and a control panel of a car.

In the display apparatus where the plurality of operating systems are operated on the single processor, the present invention permits the plurality of operating systems to share one and the same display in the different display environments one example of which is the color pallet.

What is claimed is:

1. A display apparatus where results of processing by a plurality of OSs are displayed on a same display unit, comprising:
    a memory which expands said processing results in correspondence with said plurality of OSs,
    a display environment changer which changes, in correspondence with said plurality of OSs, display environments to be set for expanding said processing results,
    a display superimposer which displays a plurality of frames in a state of being superimposed on each other, said plurality of frames being expanded into said memory, and
    an input device which receives a user input, wherein, as to one display area on a display unit at which said plurality of frames are superimposed, said input device determines further display areas, within said one display area utilized by said plurality of OSs, with reference to a position on said display unit at which said user input is performed and a superimposing mode of said plurality of frames, and transfers an input event of said user input to one of said OSs which displays at said position, wherein said input device determines, in correspondence with a background of said superimposed display, said OS to which said input event is to be transferred.

2. The display apparatus as claimed in claim 1, wherein said display environment changer sets color pallets that are different from each other in correspondence with said plurality of OSs, and expands display data into said memory in accordance with said set color pallets.

3. The display apparatus as claimed in claim 1, wherein said display environment changer sets color modes that are different from each other in correspondence with said plurality of OSs, and expands display data into said memory in accordance with said set color modes.

* * * * *